United States Patent
Wang

(10) Patent No.: US 9,107,121 B2
(45) Date of Patent: Aug. 11, 2015

(54) TERMINAL AND THE SCAN METHOD THEREOF

(75) Inventor: Ning Wang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 570 days.

(21) Appl. No.: 13/139,084

(22) PCT Filed: Dec. 16, 2008

(86) PCT No.: PCT/CN2008/073538
§ 371 (c)(1),
(2), (4) Date: Jun. 10, 2011

(87) PCT Pub. No.: WO2010/069103
PCT Pub. Date: Jun. 24, 2010

(65) Prior Publication Data
US 2011/0255517 A1    Oct. 20, 2011

(51) Int. Cl.
*H04W 36/00* (2009.01)
*H04W 48/16* (2009.01)

(52) U.S. Cl.
CPC .......... *H04W 36/0083* (2013.01); *H04W 48/16* (2013.01)

(58) Field of Classification Search
CPC ...................................................... H04W 36/24
USPC ........................... 370/331, 332; 455/436, 524
See application file for complete search history.

(56) References Cited

U.S. PATENT DOCUMENTS

| 5,539,748 A | 7/1996 | Raith |
| 5,574,996 A | 11/1996 | Raith |
| 5,883,885 A | 3/1999 | Raith |
| RE42,573 E | 7/2011 | Kim et al. |
| 2004/0219926 A1 | 11/2004 | Kim et al. |
| 2006/0281436 A1* | 12/2006 | Kim et al. .................. 455/343.2 |
| 2008/0014958 A1 | 1/2008 | Kim et al. |
| 2008/0056195 A1 | 3/2008 | Lee et al. |
| 2008/0096564 A1 | 4/2008 | Jung et al. |
| 2011/0141940 A1 | 6/2011 | Kim et al. |

FOREIGN PATENT DOCUMENTS

| CN | 1117330 A | 2/1996 |
| CN | 101032097 A | 9/2007 |
| CN | 101146333 A | 3/2008 |
| CN | 101170835 A | 4/2008 |

(Continued)

OTHER PUBLICATIONS

International Search Report for International Application No. PCT/CN2008/073538, mailed Sep. 10, 2009.

(Continued)

*Primary Examiner* — Wanda Z Russell
(74) *Attorney, Agent, or Firm* — Clark & Elbing LLP

(57) ABSTRACT

A terminal and a scan method thereof are disclosed in the present invention. The method includes that: a terminal receiving, after accessing a network, a downlink channel descriptor message, and acquiring a scan triggering period table carried in the downlink channel descriptor message; and the terminal performing periodic scan according to the scan triggering period table. According to the technical solution of the present invention, the efficiency for the terminal scanning in different scenes can be effectively improved, and therefore the performance of the system is improved.

9 Claims, 3 Drawing Sheets

(56) References Cited

FOREIGN PATENT DOCUMENTS

EP          1473956  A2    11/2004
JP      2004-221671  A      8/2004

OTHER PUBLICATIONS

Written Opinion for International Application No. PCT/CN2008/073538, mailed Sep. 10, 2009.

International Preliminary Report on Patentability for International Application No. PCT/CN2008/073538, issued Jun. 21, 2011.
Extended European Search Report for European Patent Application No. 08878847.6, dated Mar. 5, 2014 (8 pages).
Itzik Kitroser, "IEEE 802.16e Handoff Draft," Internet Citation, Mar. 13, 2003, XP002331124, URL: http://www.ieee802.org/16/tge/contrib/C80216e-03_20rl.pdf (22 pages).
"Additional Scan Measurement Metric, Triggers and Reporting Modes; C80216e-05_219r2", IEEE Draft; C80216E-05_219R2, IEEE-SA. Piscataway, NJ USA, Jun. 13, 2005 (18 pages).

* cited by examiner

TERMINAL AND THE SCAN METHOD THEREOF

FIELD OF THE INVENTION

The present invention relates to the communication field, and particularly to a terminal and a scan method of a terminal.

BACKGROUND OF THE INVENTION

At present, a Worldwide Interoperability for Microwave Access (WiMAX for short) standard is a broadband wireless access standard established by the Institute for Electrical and Electronic Engineers (hereinafter referred to as IEEE) Standard Organization, wherein a mobile WiMAX standard adds the support, such as terminal scanning and terminal handover mechanism in the mobile WiMAX standard, for the mobility of a terminal compared with a fixed WiMAX standard.

In the mobile WiMAX system, the terminal must perform scanning before it performs handover, so as to acquire the downlink signal quality, wherein the scanning can include intra frequency scanning and inter frequency scanning. With regard to the inter frequency scanning, the WiMAX protocol stipulates that the terminal can only achieve scanning consultation (negotiation) through the manner of the interaction of scanning request/scanning response (MOB-SCN-REQ/RSP) messages.

At present, the main triggering method of the scanning is a threshold triggering, and triggering (Trigger) parameters in a Downlink Channel Descriptor (DCD for short) of the mobile WiMAX standard defines the main triggering method of the scanning. Table 1 describes the triggering value (Trigger value) and average triggering period (average Trigger period) in the Trigger parameters, and Table 2 describes the type/function/operation in the Trigger parameters. As shown in Table 1 and Table 2, the triggering metric type (Trigger metric type) includes, but not limited to: Carrier to Interference Plus Noise Ratio (CINR for short), Received Signal Strength Indication (RSSI for short) and Round Trip Delay (RTD for short).

TABLE 1

| Name | Type | Length (1 byte) | Value |
|---|---|---|---|
| Type/Function/Operation | 54.1 | 1 | Refer to the description in Table 2 |
| Trigger Value | 54.2 | 1 | This parameter is used for comparing with a measurement metric parameter so as to determine the trigger value of trigger condition |
| Average Trigger Period | 54.3 | 1 | Average trigger period is the period from averaging the metric measurement values; when this average value reaches a measurement trigger threshold, the terminal responds with a specified trigger operation |

TABLE 2

| Name | Length | Value |
|---|---|---|
| Type | 2 bits (MSB) | Trigger metric type:<br>0x0: CINR metrics<br>0x1: RSSI metrics<br>0x2: RTD metrics<br>0x3: reserved |

TABLE 2-continued

| Name | Length | Value |
|---|---|---|
| Function | 3 bits | The calculation and definition of trigger conditions:<br>0x0: reserved<br>0x1: the metric value of neighboring BS is more than a certain absolute value<br>0x2: the metric value of neighboring BS is less than a certain absolute value<br>0x3: the metric value of neighboring BS is more than a relative value of the serving BS<br>0x4: the metric value of neighboring BS is less than a relative value of the serving BS<br>0x5: the metric value of the serving BS is more than an absolute value<br>0x6: the metric value of the serving BS is less than an absolute value<br>0x7: reserved<br>Note 1: 0x1-0x4 cannot be used for an RTD metric method<br>Note 2: When Type 0x1 and Function 0x3 or 0x4 are used together, the scope of the threshold value ranges from −32 dB (0x80) to +31.75 dB (0x7F); when Type 0x1 and Function 0x1, 0x2, 0x5 or 0x6 are used together, the threshold value is explained as an unsigned byte and its unit is 0.25 dB, for example, 0x00 is expressed as −103.75 dBm, and 0xFF is expressed as −40 dBm |
| Operation | 3 bits (LSB) | Operations to be executed after a trigger condition is met:<br>0x0: reserved<br>0x1: send scanning report (MOB_SCN-REP) message at every scanning interval<br>0x2: initiate a handover request message (MOB_MSHO-REQ) of the terminal side<br>0x3: terminal initiates the scanning process of neighboring Base Station or initiates the automatic neighboring scanning (see 8.4.13.1.3), or triggers both of them simultaneously through a scanning request message (MOB-SCN-REQ).<br>0x5-0x7: reserved<br>Note: 0x3 is only used in the situation where the functions are 0x5-6 |

It can be seen from Table1 and Table 2 that according to the description in the WiMAX protocol, with regard to the metric method of the CINR, scanning can be triggered only through the absolute threshold triggering method of service base station downlink CINR measurement, i.e. when the CINR of the terminal under the serving base station is less or more than a certain CINR, the scanning will be triggered. However, because this method only considers the CINR at the source side, the CINR of a neighboring cell may be much more than the CINR of the current serving Base Station; nonetheless, since the CINR of the current serving Base Station does not reach the triggering threshold, the terminal will not perform scanning, and cannot hand over to the neighboring cell with a higher CINR, thus resulting in that throughput of the system cannot reach an optimum state.

SUMMARY OF THE INVENTION

This invention is proposed with regard to the problem in the related art that the triggering method of the scanning can only use threshold triggering, which results in that the throughput of the system cannot reach the optimum state. Therefore, the main object of this invention is to provide an improved scan method of a terminal to resolve the above mentioned problem in the related art.

In order to achieve the above mentioned purpose, according to one aspect of this invention, a scan method is provided.

The scan method according to this invention includes: a terminal receiving, after accessing a network, a downlink channel descriptor message, and acquiring a scan triggering period table carried in the downlink channel descriptor message; and the terminal performing periodic scan according to the scan triggering period table.

Preferably, after the step of the terminal performing periodic scan according to the scan triggering period table, the method further comprises: the terminal determining whether to trigger a handover process according to the result of the periodic scan.

Preferably, the downlink channel descriptor message carries one or multiple scan triggering period tables.

Preferably, the scan triggering period table comprises: trigger metric type, metric value, scan triggering period, and one-to-one correspondence relationship between the trigger metric type, the metric value and the scan triggering period.

Preferably, the trigger metric type is: Carrier to Interference Plus Noise Ratio (CINR); the step of the terminal performing periodic scan according to the scan triggering period table comprises: the terminal monitoring downlink CINR of a serving base station; the terminal comparing the monitored downlink CINR with the metric value, determining a corresponding scan triggering period according to the comparison result and the correspondence relationship, and performing the periodic scan according to the scan triggering period.

Preferably, the trigger metric type is: Received Signal Strength Indication (RSSI); the step of the terminal performing periodic scan according to the scan triggering period table comprises: the terminal monitoring downlink RSSI of a serving base station; the terminal comparing the monitored downlink RSSI with the metric value, determining a corresponding scan triggering period according to the comparison result and the correspondence relationship, and performing the periodic scan according to the scan triggering period.

Preferably, the trigger metric type is: Round Trip Delay (RTD); the step of the terminal performing periodic scan according to the scan triggering period table(s) comprises: the terminal monitoring the RTD of a serving base station; the terminal comparing the monitored RTD with the metric value, determining a corresponding scan triggering period according to the comparison result and the correspondence relationship, and performing the periodic scan according to the scan trigger period.

In order to achieve the above mentioned purpose, according to one aspect of the present invention, a terminal is provided.

The terminal according to the present invention comprises: a receiving module, configured to receive a downlink channel descriptor message after the terminal accesses a network; an acquiring module, configured to acquire a scan triggering period table carried in the downlink channel descriptor message; and a scanning module, configured to perform periodic scan according to the scan triggering period table.

Preferably, the above mentioned terminal further comprises: a handover module, configured to determine whether to trigger a handover process according to the result of the periodic scan.

Preferably, the downlink channel descriptor message carries one or multiple scan triggering period tables; and/or the scan triggering period table comprises: trigger metric type, metric value, scan triggering period, and one-to-one correspondence relationship between the trigger metric type, the metric value, and the scan triggering period, wherein the trigger metric type comprises: Carrier to Interference Plus Noise Ratio (CINR), Received Signal Strength Indication (RSSI) and Round Trip Delay (RTD).

In virtue of the technical solution of the present invention, the terminal performs periodic scan according to the scan triggering period table(s), solving the problem in the related art that the system throughput fails to reach the optimum state which results from that only the threshold triggering can be used as the triggering method of the scanning; therefore, the efficiency for the terminal scanning in different scenes can be efficiently improved and the performance of the system can be improved.

The other features and advantages of the present invention will be described in the following Specification, and will partially become obvious in the Specification, or will be understood by carrying out the present invention. The objectives and other advantages of the present invention can be achieved and obtained through the structures specifically indicated in Specification, Claims and Drawings.

BRIEF DESCRIPTION OF THE DRAWINGS

The Drawings are provided for further understanding of the present invention, and constitute a part of the specification. They are used to explain the present invention along with the embodiments of the present invention, and shall not constitute the limitations to the present invention. In the Drawings.

DETAILED DESCRIPTION OF THE EMBODIMENTS

Summary of Functions

In the related art, the triggering method for the scan of the terminal can only be a threshold triggering; however, in the case of low signal quality of the serving base station of the terminal, the terminal can not scan other cells with better signal quality to perform handover because the triggering threshold is not reached; therefore, such simplex triggering method may result in non-optimization of system performance. The present invention provides an improved scan solution for the above mentioned problem. In the technical solution of the present invention, after accessing a network, the terminal receives a downlink channel descriptor message, acquires a scan triggering period table carried in the downlink channel descriptor message, and performs periodic scan according to the scan triggering period table.

Hereinafter, the preferred embodiments of the present invention will be described with reference to the drawings. It should be understood that the preferred embodiments described herein are only used to describe and explain instead of limiting the present invention.

In the following description, for the purpose of explanation, a description of many specific details is given to provide a thorough understanding of the present invention; however, it is obvious that the present invention can also be achieved without these specific details. Moreover, the following embodiments and each of their specific details can be combined in various manners with the provision that the spirits and scope described in the attached claims are not deviated.

METHOD EMBODIMENTS

Figure 1:
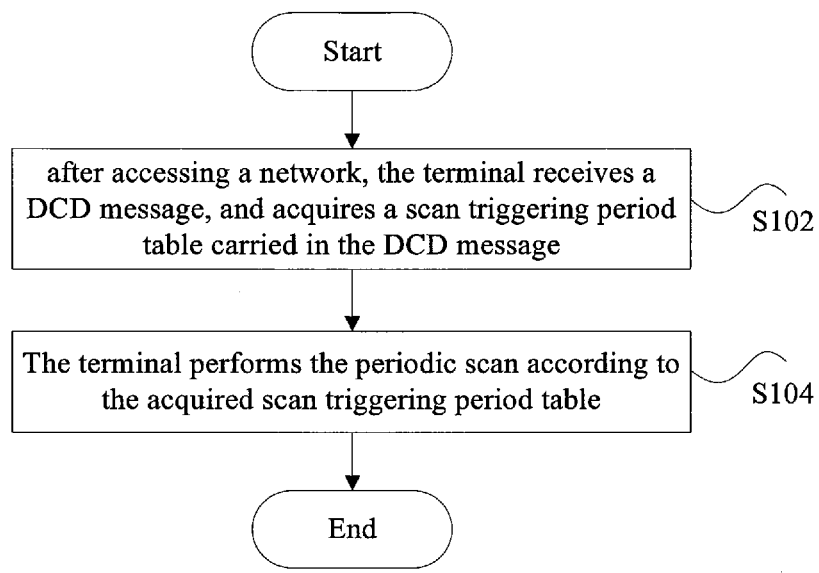
FIG. 1 is the flowchart of the scan method according to an embodiment of the present invention.

According to an embodiment of the present invention, a scan method is provided. FIG. 1 is the flowchart of the scan method according to this embodiment of the present invention. As shown in FIG. 1, the method includes the steps as follows (Step S102-Step S104).

Step S102, after accessing a network, the terminal receives a DCD message sent from the network side, and acquires a scan triggering period table carried in the DCD message.

In the above, the Scan Triggering Period (Scan Trigger Period) table parameter carried in the DCD message carries one or multiple sets of the scan triggering period tables as shown in Table 3. The scan triggering period table includes, but not limited to the following parameters: trigger metric type, metric value, scan triggering period, and the one-to-one correspondence relationship between the trigger metric type, the metric value and the scan triggering period. The terminal acquires the scan triggering period table(s) and the parameters thereof from this DCD message.

TABLE 3

| Name | Type (1 byte) | Length | Value |
| --- | --- | --- | --- |
| Scan Triggering Period Table | 130 | Variable | |
| Trigger Metric Type | 130.1 | 1 | Trigger Metric Type: 0x0: DL CINR metrics 0x1: DL RSSI metrics 0x2: RTD metrics |
| Metric Value | 130.2 | 1 | When Type is 0x0, the value of this parameter ranges from −32 dB (0x80) to +31.75 dB (0x7F); When Type is 0x1, the value of this parameter is an unsigned integer with the step length of 0.25 dB, wherein 0x00 indicates −103.75 dBm and 0xFF indicates −40 dBm |
| Period | 130.3 | 1 | The period of the scan triggering, and the unit thereof is second |

Step S104: The terminal performs periodic scan according to the acquired scan triggering period table(s), and determines whether to trigger handover process according to the result of the periodic scan.

That is, the terminal determines the periodic scan triggering method to be adopted according to the scan triggering period sent by the system, wherein there can be multiple types of selection bases for the scan period, for example, the terminal can select an appropriate period to perform scan triggering according to the current CINR, RSSI and/or RTD parameters.

Specifically, in Step S104, the terminal will firstly determine the trigger metric type according to the trigger metric type, metric value, scan triggering period, and the one-to-one correspondence relationship between the trigger metric type, metric value and the scan trigger period in one or multiple sets of scan triggering period tables acquired in Step S102. Based on different trigger metric types, the following three situations can be included:

Situation 1: If the terminal determines that all the trigger metric types in the one or multiple sets of scan triggering period tables are the CINR, the terminal will need to monitor the downlink CINR of the serving BS; compares the monitored downlink CINR with the acquired metric value, determines a corresponding scan triggering period according to the comparison result and the acquired correspondence relationship, and performs periodic scan according to the scan period.

Situation 2: If the terminal determines that all the trigger metric types of the one or multiple sets of scan triggering period tables are the RSSI, the terminal will need to monitor the downlink RSSI of the serving BS; compares the monitored downlink RSSI with the acquired metric value, determines a corresponding scan triggering period according to the comparison result and the acquired correspondence relationship, and performs periodic scan according to the scan period.

Situation 3: If the terminal determines that all the trigger metric types of the one or multiple sets of scan trigger period tables is the RTD, the terminal will need to monitor the RTD of the serving BS; compares the monitored RTD with the acquired metric value, determines a corresponding scan triggering period according to the comparison result and the acquired correspondence, and performs periodic scan according to the scan period.

It needs to be noted that, in practical applications, if the DCD message carries multiple sets of scan triggering period tables and the trigger metric types of those sets of scan triggering period tables are different, the terminal will need to determine which one of the scan triggering periods corresponding to the trigger metric types is shorter and select the trigger metric type with shorter scan triggering period.

By the foregoing operation, the terminal can perform periodic scan according to the scan triggering period table(s) and avoid the simplex threshold triggering scan method, thus optimizing the throughput of the system.

Device Embodiments

Figure 2:
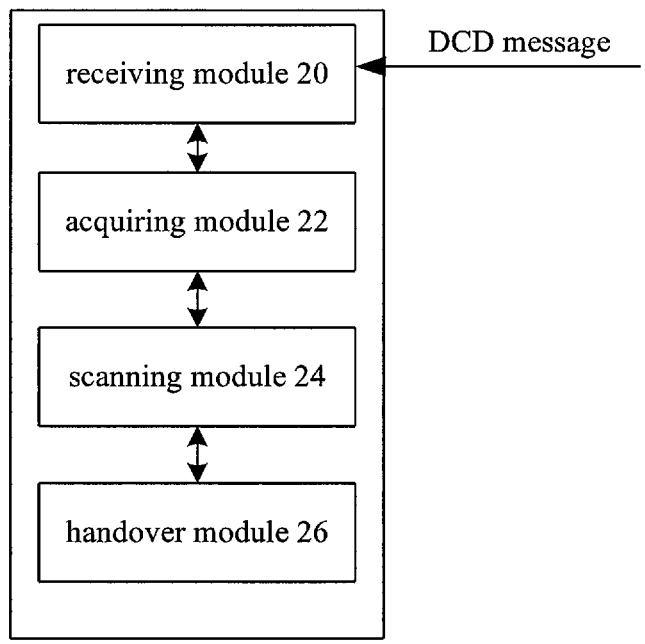
FIG. 2 is the block diagram of the terminal according to an embodiment of the present invention.

According to an embodiment of the present invention, a terminal is provided. FIG. 2 is the block diagram of the terminal according to this embodiment of the present invention, and as shown in FIG. 2, the terminal according to the embodiment of the present invention comprises a receiving module 20, an acquiring module 22, a scanning module 24 and a handover module 26.

Specifically, in the terminal according to the embodiment of the present invention, the receiving module 20 is used to receive a DCD message after the terminal accesses a network; specifically, the Scan Triggering Period (Scan Trigger Period) table parameter in the DCD message sent from the network side will carry one or multiple sets of scan triggering period tables (referring to Table 1), and the scan triggering period table(s) includes, but not limited to the following parameters: trigger metric type, metric value, scan triggering period and the one-to-one correspondence relationship between the trigger metric type, the metric value and the scan triggering period.

The acquiring module 22 in the terminal is connected to the receiving module 20, and is used to acquire the scan triggering period table(s) carried in the DCD message and the parameters in the scan triggering period table(s); the scanning module 24 is connected to acquiring module 22, and is used to select a scan period according to the scan triggering period table(s) and perform periodic scan, wherein, there can be multiple types of selection bases for the scan period, for example, the scanning module 24 can select an appropriate period to perform scan triggering according to the current CINR, PSSI and/or RTD parameters; and the handover module 26 is connected to the scanning module 24, and is used to determine whether to trigger a handover process according to the result of the periodic scan.

Hereinafter, the scanning module 24 in the terminal will be further illustrated. The scanning module 24 will firstly determine the trigger metric type according to the trigger metric type, metric value, scan triggering period, and the one-to-one correspondence relationship between the trigger metric type, the metric value and the scan triggering period in one or multiple sets of scan triggering period tables acquired by the acquiring module 22, if the scanning module 24 determines that all the trigger metric types of the one or multiple sets of scan triggering period tables are the CINR, the scanning module 24 will need to monitor the downlink CINR of the serving BS, compare the monitored downlink CINR with the acquired metric value, determine a corresponding scan triggering period according to the comparison result and the acquired correspondence relationship, and perform periodic scan according to the scan period. If the scanning module 24 determines that all the trigger metric types of the one or multiple sets of scan triggering period tables are the RSSI, the scanning module 24 will need to monitor the downlink RSSI of the serving BS, compare the monitored downlink RSSI with the acquired metric value, determine a corresponding scan triggering period according to the comparison result and the acquired correspondence relationship, and perform periodic scan according to the scan period. If the scanning module 24 determines that all the trigger metric types of the one or multiple sets of scan triggering period tables are the RTD, the scanning module 24 will need to monitor the RTD of the serving BS, compare the monitored RTD with the acquired metric value, determine a corresponding scan triggering period according to the comparison result and the acquired correspondence relationship, and perform periodic scan according to the scan period.

In addition, it needs to be noted that, in practical applications, if the DCD message carries multiple sets of scan triggering period tables and the trigger metric types in the multiple sets of scan triggering period tables are different, the scanning module 24 will need to determine which one of the scan triggering periods corresponding to the trigger metric types is shorter and select the shorter scan trigger period to perform scanning.

It needs to be noted that each foregoing module can be altered and combined with the provision that the spirit and scope described in the attached claims are not deviated.

Figure 3:
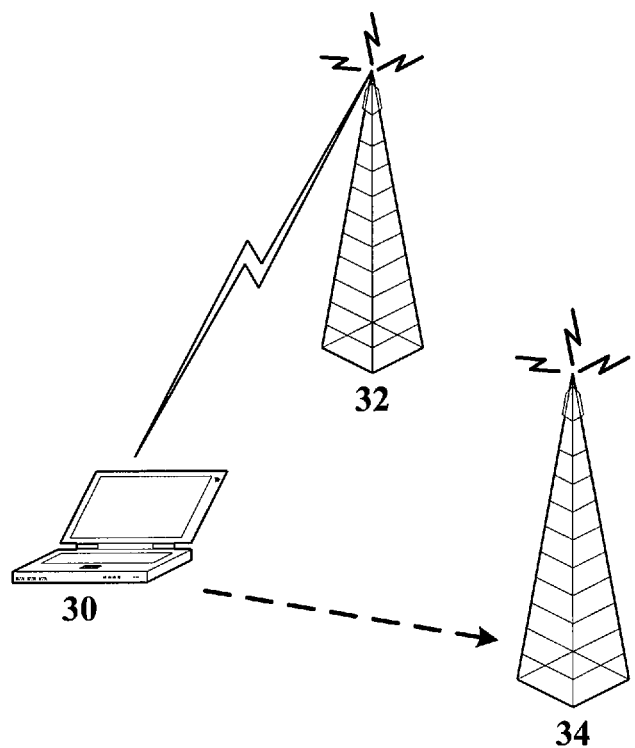
FIG. 3 is the schematic diagram of the WiMAX scan and handover according to an embodiment of the present invention.

Hereinafter, the technical solution of the present invention will be illustrated in conjunction with the foregoing method embodiments and device embodiments. FIG. 3 is a schematic diagram of the WiMAX scan and handover according to the embodiment of the present invention, as shown in FIG. 3, 30 is the terminal according to the device embodiment of the present invention, 32 is base station 1 (BS1) and 34 is base station 2 (BS2), wherein BS1 and BS2 configure neighboring cells for each other.

Terminal 30 selects BS1 as its serving BS after start-up and accesses a network. The receiving module 20 of terminal 30 receives the DCD message sent from BS1 and keeps the synchronization at the MAC layer; this DCD message includes one or multiple sets of scan triggering period tables, each of which contains key information such as trigger metric type, metric value and scan trigger period, etc.

If the scan triggering period parameter in the DCD message adopts the CINR as the trigger metric type and the DCD message is configured with three scan triggering periods (Scan Trigger Periods) which are based on the CINR, the acquiring module 22 of terminal 30 can acquire a table as shown in Table 4 according to the parameter carried in the DCD, and in Table 4, CINR1>CINR2>CINR3, P1>P2>P3.

TABLE 4

| Trigger Metric Type | Metric Value | Period |
| --- | --- | --- |
| CINR | CINR1 | P1 |
| CINR | CINR2 | P2 |
| CINR | CINR3 | P3 |

Figure 4:
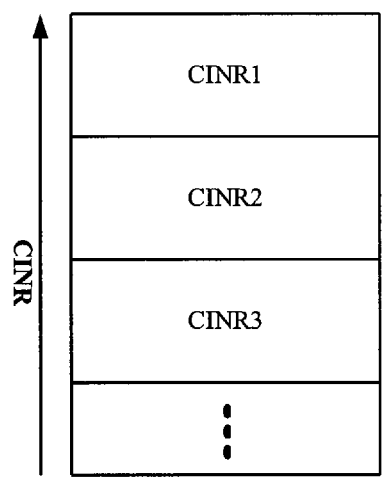
FIG. 4 is the schematic diagram of the CINR triggering periodic scan according to an embodiment of the present invention.

The scanning module 24 of terminal 30 monitors the downlink CINR of the serving BS, as shown in FIG. 4, when the condition of CINR>CINR1 is satisfied, the scanning module 24 triggers a scanning process with P1 as the period; when the condition of CINR2<CINR<CINR1 is satisfied, the scanning module 24 triggers a scanning process with P1 as the period; when the condition of CINR3<CINR<CINR2 is satisfied, the scanning module 24 triggers a scanning process with P2 as the period; and when the condition of CINR<CINR3 is satisfied, the scanning module 24 triggers a scanning process with P3 as the period.

If the scan triggering period parameter in the DCD message adopts the RSSI as the trigger metric type, and the DCD message is configured with three scan triggering periods (Scan Trigger Periods) based on the RSSI, the receiving module 22 of terminal 30 can acquire a table as shown in Table 5 according to the parameter carried in the DCD, and in Table 5, RSSI1>RSSI2>RSSI3, P1>P2>P3.

TABLE 5

| Trigger Metric Type | Metric Value | Period |
| --- | --- | --- |
| RSSI | RSSI 1 | P1 |
| RSSI | RSSI 2 | P2 |
| RSSI | RSSI 3 | P3 |

Figure 5:
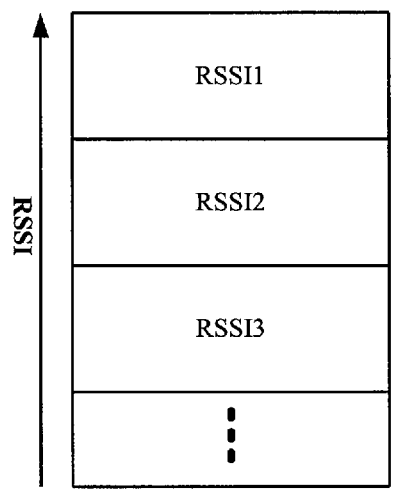
FIG. 5 is the schematic diagram of the RSSI triggering periodic scan according to an embodiment of the present invention.

The scanning module 24 of terminal 30 monitors the downlink RSSI of the serving BS, as shown in FIG. 5, when the condition of RSSI>RSSI1 is satisfied, the scanning module 24 triggers a scanning process with P1 as the period; when the condition of RSSI2<RSSI<RSSI1 is satisfied, the scanning module 24 triggers a scanning process with P1 as the period; when the condition of RSSI3<RSSI<RSSI2 is satisfied, the scanning module 24 triggers a scanning process with P2 as the period; and when the condition of RSSI<RSSI3 is satisfied, the scanning module 24 triggers a scanning process with P3 as the period.

If the scan triggering period parameter in the DCD message adopts the RTD as the Trigger metric Type, and the DCD message is configured with three scan triggering periods (Scan Trigger Periods) based on the RTD, the receiving module 22 of terminal 30 can acquire a table as shown in Table 6 according to the parameter carried in the DCD, and in Table 6, RTD1<RTD2<RTD3, P1>P2>P3.

TABLE 6

| Trigger Metric Type | Metric Value | Period |
| --- | --- | --- |
| RTD | RTD1 | P1 |
| RTD | RTD2 | P2 |
| RTD | RTD3 | P3 |

Figure 6:
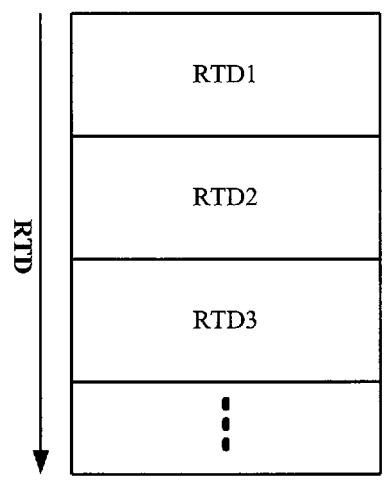
FIG. 6 is the schematic diagram of the RTD triggering periodic scan according to an embodiment of the present invention.

The scanning module 24 of terminal 30 monitors the RTD of itself and the serving BS, as shown in FIG. 6, when the condition of RTD<RTD1 is satisfied, the scanning module 24 triggers a scanning process with P1 as the period; when the condition of RTD1<RTD<RTD2 is satisfied, the scanning module 24 triggers a scanning process with P1 as the period; when the condition of RTD2<RTD<RTD3 is satisfied, the scanning module 24 triggers a scanning process with P2 as the period; and when the condition of RTD<RTD3 is satisfied, the scanning module 24 triggers a scanning process with P3 as the period.

The receiving module 24 triggers scanning according to the periodic triggering method; when the scanned signal quality of BS2 satisfies the requirements for handover during the scanning, the handover module 26 of terminal 30 initiates a handover process.

In conclusion, in virtue of the technical solution of the present invention, the terminal performs periodic scan according to the scan triggering period table(s), solving the problem in the related art that the system throughput fails to reach the optimum state due to that only the threshold triggering can be used as the scan triggering method; therefore, the efficiency for the terminal scanning in different scenes can be efficiently improved and the performance of the system is improved.

The above-mentioned are only preferred embodiments of the present invention, and shall not be the limitations to the present invention. As for those skilled in the art, the present invention can have various modifications and changes. Any modification, equivalent substitution, and improvement etc. within the principle and spirit of the present invention should be under the protection scope of the present invention.

What is claimed is:

1. A scan method, comprising:
a terminal receiving, after accessing a network, a downlink channel descriptor message, and acquiring a scan triggering period table carried in the downlink channel descriptor message, wherein the scan triggering period table comprises: trigger metric type, metric value, scan triggering period, and one-to-one correspondence relationship between the trigger metric type, the metric value and the scan triggering period; and
the terminal selecting an appropriate period to perform scan triggering periodic scan according to the trigger metric type, metric value and the correspondence relationship in the scan triggering period table.

2. The method according to claim 1, wherein after the step of the terminal performing periodic scan according to the scan triggering period table, the method further comprises:
the terminal determining whether to trigger a handover process according to the result of the periodic scan.

3. The method according to claim 1, wherein the downlink channel descriptor message carries one or multiple scan triggering period tables.

4. The method according to claim 1, wherein the trigger metric type is: Carrier to Interference Plus Noise Ratio (CINR);
the step of the terminal performing periodic scan according to the scan triggering period table comprises:
the terminal monitoring downlink CINR of a serving base station;
the terminal comparing the monitored downlink CINR with the metric value, determining a corresponding scan triggering period according to the comparison result and the correspondence relationship, and performing the periodic scan according to the scan triggering period.

5. The method according to claim 1, wherein the trigger metric type is: Received Signal Strength Indication (RSSI);
the step of the terminal performing periodic scan according to the scan triggering period table comprises:
the terminal monitoring downlink RSSI of a serving base station;
the terminal comparing the monitored downlink RSSI with the metric value, determining a corresponding scan triggering period according to the comparison result and the correspondence relationship, and performing the periodic scan according to the scan triggering period.

6. The method according to claim 1, wherein the trigger metric type is: Round Trip Delay (RTD);
the step of the terminal performing periodic scan according to the scan triggering period table(s) comprises:
the terminal monitoring the RTD of a serving base station;
the terminal comparing the monitored RTD with the metric value, determining a corresponding scan triggering period according to the comparison result and the correspondence relationship, and performing the periodic scan according to the scan trigger period.

7. A terminal, comprising:
a receiving module, configured to receive a downlink channel descriptor message after the terminal accesses a network;
an acquiring module, configured to acquire a scan triggering period table carried in the downlink channel descriptor message, wherein the scan triggering period table comprises: trigger metric type, metric value, scan triggering period, and one-to-one correspondence relationship between the trigger metric type, the metric value and the scan triggering period; and
a scanning module, configured to select an appropriate period to perform scan triggering periodic scan according to the trigger metric type, metric value and the correspondence relationship in the scan triggering period table.

8. The terminal according to claim 7, wherein the terminal further comprises:
a handover module, configured to determine whether to trigger a handover process according to the result of the periodic scan.

9. The terminal according to claim 7, wherein,
the downlink channel descriptor message carries one or multiple scan triggering period tables; and/or the trigger metric type comprises: Carrier to Interference Plus Noise Ratio (CINR), Received Signal Strength Indication (RSSI) and Round Trip Delay (RTD).

* * * * *